United States Patent [19]

Revelle

[11] 4,328,640
[45] May 11, 1982

[54] ROPE WICK

[76] Inventor: William F. Revelle, 3000 Bryant Rd., Mobile, Ala. 36605

[21] Appl. No.: 203,581

[22] Filed: Nov. 3, 1980

[51] Int. Cl.³ .......................................... A01M 21/00
[52] U.S. Cl. ............................................ 47/1.5; 87/6;
                                                       239/145; 405/45
[58] Field of Search ....................... 47/1.5; 239/44–45,
                                              239/145; 87/6; 405/45

[56] References Cited

U.S. PATENT DOCUMENTS 4,162,863  7/1979  Gaudard et al. ..................... 405/45
4,219,964  9/1980  Dale ..................................... 47/1.5

*Primary Examiner*—Robert E. Bagwill
*Attorney, Agent, or Firm*—Robert F. Ziems

[57] ABSTRACT

A rope wick for selectively applying liquid chemicals to plants. The rope wick comprises an outer covering made of braided polyester yarn and an inner core made of spun acrylic yarn.

6 Claims, 3 Drawing Figures

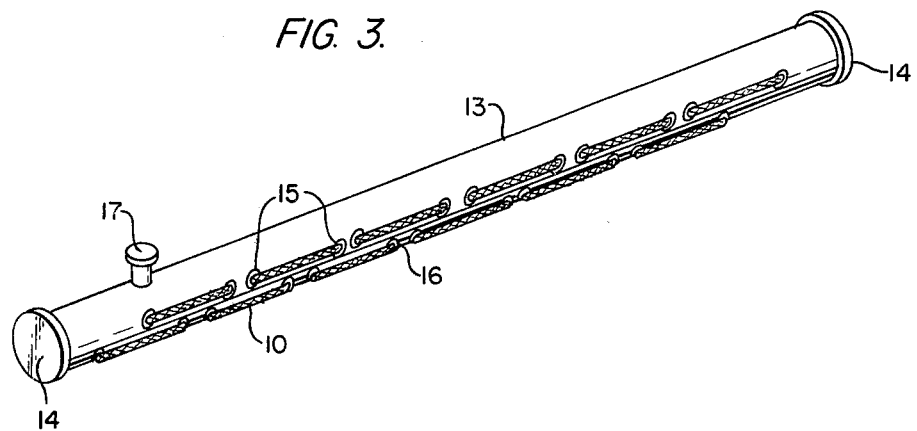
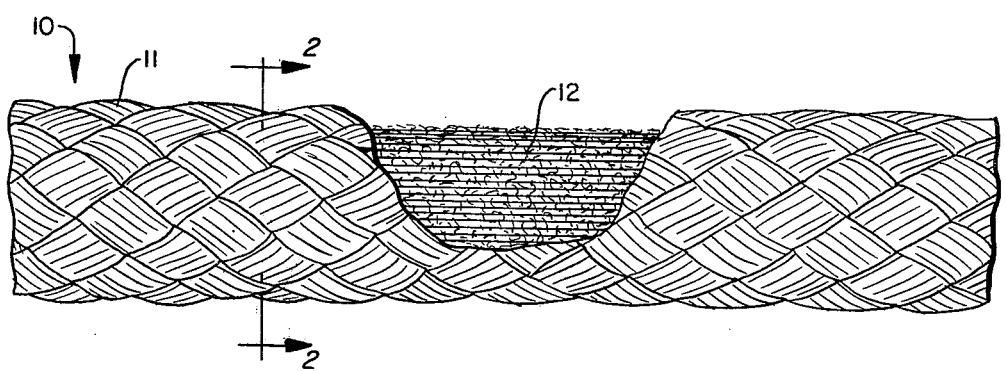
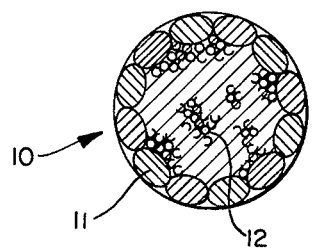

4,328,640

ROPE WICK

BACKGROUND OF THE INVENTION (1) Field of the Invention

The invention is in the field of rope wicks which selectively apply liquid chemicals to plants.

(2) Description of the Prior Art

The prior art includes U.S. Pat. No. 4,219,964 to Jim E. Dale issued Sept. 2, 1980. The Dale patent discloses an apparatus and system for the systematic application of liquid chemicals to plants. A soft woven nylon rope wick is used to convey chemical solution from a reservoir by means of capillary action. The rope apparatus, which is physically supported, is leveled and positioned to selectively contact certain plants as the wick is moved across an agricultural field. Thus, chemical solution is deposited selectively only on contact with the wick.

The rope wick is described in the Dale patent as being solid braid nylon rope G-1032 ½" in diameter manufactured by Wellington Puritan Mills, Madison, Ga.; picks per inch 2.75 relax; feet per pound 18.5; break strength 4,200 pounds; woven from 32 ends of 840 denier multifilament nylon yarn using 18 bobbins per carrier.

SUMMARY OF THE INVENTION

The invention is a rope wick useful for selectively applying liquid chemicals to plants. The rope wick is comprised of an outer covering made of braided polyester yarn and an inner core made of spun acrylic yarn. Field tests show that the present rope wick using a standard 1:2 mixture of glyphosate herbicide and water gives unexpectedly good weed control results which are twice as high or effective as the solid braid nylon rope wick used in the prior art.

BRIEF DESCRIPTION OF THE DRAWINGS

FIG. 1 is a side elevational view, partially cut away, of a rope wick constructed in accordance with the principles of the present invention;

FIG. 2 is a vertical cross-sectional view of the inventive rope wick taken along line 2—2 of FIG. 1; and FIG. 3 is a side perspective view of a rope wick applicator showing an external view of the component parts of the apparatus constructed for application of liquid agricultural chemicals to undesired plants ("weeds") growing taller than the field crop canopy.

DESCRIPTION OF THE PREFERRED EMBODIMENTS

Referring to the drawings, FIGS. 1 and 2 illustrate a rope wick 10 constructed in accordance with the principles of the present invention. Rope wick 10 is made of an outer covering 11 of polyester yarn constructed over an inner core 12 of spun acrylic yarns.

FIG. 3 illustrates a typical arrangement of an applicator 13 which uses the rope wick 10. Applicator 13 is a combination reservoir and boom for supporting rope wick 10. Applicator 13 may be made from hollow pipe (e.g., plastic or aluminum pipe) and is moved in a horizontal position at the correct height across the crop field by any convenient power source. As the vegetation is struck by the exposed portions of wick 10, liquid solution is wiped from wick 10 onto the foliage of the plants to be treated.

Applicator 13 is filled or partially filled with chemical solution (herbicide or any other desired liquid solution) for treating plants or foliage. The ends of applicator 13 are closed with caps 14.

Wick 10 can be of any length, but will usually be determined by the spacing of a plurality of holes 15 (which are typically ⅜" in diameter) spaced along the outer circumference of the applicator 13. Holes 15 may be typically spaced 6 or 8 inches apart. Wick 10 is placed through holes 15 in the manner shown in FIG. 3. One end of wick 10 is fed through the next horizontal hole 15 in applicator 13. Thus, the ends of wick 10 are thoroughly immersed in the chemical solution contained in the body of the applicator 13.

Additional chemical solution can be added as needed to the body of applicator 13 through fill cap 17. Rubber grommets 16 hold the segments of wick 10 in holes 15 as well as preventing spillage or seeping of chemical solution from the applicator 13. The quantity of chemical solution dispensed per unit area of field treated is dependent on the number of contacts of the solution-laden wick with plants growing in the path of applicator 13 moving across the field. Ordinarily, applicator 13 is clamped in a position so that wick 10 is facing toward the plants encountered as the apparatus is moved across the field. Where dense plant cover is encountered, the flow of chemical solution from applicator 13 to the external portion of wick 10 can be increased by rotating the applicator 13 about its longitudinal axis so that more segments of wick 10 on the bottom of the boom come into contact with the foliage or plants. It should be understood that the number and length of wick 10 segments will determine the amount of agricultural chemical solution and concentration of solution dispensed on the foliage. The number and spacing of holes 15 will also determine the amount of treatment administered to the plants or foliage.

The preferred embodiment of the invention is a one-half inch diameter rope wick made from a combination of polyester and acrylic yarns. The inventive rope wick exhibits excellent flow characteristics when used on rope wick applicators such as described in the Dale patent (U.S. Pat. No. 4,219,964 whose teachings are hereby incorporated by reference) for the application of non-selective foliar-applied herbicides to undesired vegetation growing in crop fields.

The term "polyester" as used herein is a generic term denoting a complex ester formed by polymerization or condensation and used to make fibers. Polyester yarns are made of polyester fibers or filaments. Polyester yarns are widely available from commercial sources in various deniers and filament counts.

The preferred polyester yarn is of the type which is known in the trade as slick or flat industrial grade yarn which refers to the fact that the yarn has relatively little or zero twist. Suitable commercially available polyester yarns are: Allied Chemical Company generic polyester yarn of 1000 denier with a filament count of 140; Celanese FORTREL polyester yarn; and DuPont DACRON polyester yarn. These polyester yarns provide the high abrasion resistance needed for the outer covering of the inventive rope wick in order to protect the core.

The term "acrylic" as used herein is a generic term denoting polymers of acrylic acid or its derivatives. The term "acrylic" as used herein also includes "modified acrylic" polymers which are long-chain polymers composed of 35 to 85 percent by weight of acrylonitrile units. Furthermore, the term "acrylic" is defined to include blends of acrylic and modified acrylic fibers.

Acrylic yarns are made of acrylic fibers or filaments. Acrylic fibers are widely available from commercial sources such as ACRILAN by Monsanto Company. Particularly important characteristics of acrylic fibers are that they are extruded in a figure-8 cross-sectional shape or in a "dog-bone" cross-sectional shape and that the outer surface of the acrylic fibers is relatively scaly. It is theorized that these acrylic fiber characteristics provide the high capillary action effect which gives the present invention the observed high recharge ability (i.e., the rope wick becomes wet again very quickly after being wiped against a plant). The acrylic yarn core provides a reservoir of stored herbicide solution which is readily transferable to vegetation contacting the outer covering of polyester yarn.

The preferred acrylic yarn is of the type which is known in the trade as spun industrial grade yarn which refers to the fact that the yarn is composed of acrylic filaments that have been chopped into short length fibers (called "staple") and then re-spun and twisted as though they were cotton fibers. Such spun acrylic yarns are designated according to the cotton count (or "cc") system. Suitable spun acrylic yarns are widely used in the carpet industry and are available from spinners such as Palmetto Spinning Mills in Palmetto, S.C.

Polyester yarn and acrylic yarn are both relatively non-swelling when wetted (low in moisture regain) and relatively non-shrinking when dried.

EXAMPLE

The technical description of an exemplary rope wick is: a twelve carrier plain weave braided outer covering of polyester yarn constructed over an intercore of spun acrylic yarns using a maypole braiding machine. The technical specifications of this particular rope wick are:

Outer Covering
  yarn—12 carriers of 32,000 denier polyester yarn each
  picks/inch—3.3
  construction—plain weave
Core
  yarn—six strands, each of which are cabled from eight ends of two-ply 2.14 cc spun acrylic yarn.
  cable twist—9 turns per foot
  plytwist—2.5 turns per inch
  single yarn twist—4.0 turns per inch
  Break strength: 4,400 pounds
  Total rope fiber content:
    66% polyester by wt.
    34% acrylic by wt.

Range of variations that yield no significant changes in flow rate:
Construction
  (1) 16 carrier twill weave
  (2) 20 carrier twill weave
  (3) 24 carrier twill weave
  (4) 12 carrier plain or 24 carrier basket weave
  (5) 10 carrier plain or 20 carrier basket weave
Fiber Percentages
  50% polyester/50% acrylic (24 carrier twill)
  70% polyester/30% acrylic (10 carrier plain)
Picks/Inch
  2.7 to 4.0 (12 carrier plain)

Variations in twist construction and/or individual yarn size of core have no significant effect on the flow performance as long as the percentage of acrylic core falls within the range of 30% to 50% of the total rope wick weight.

The rope wick of the present invention would not ordinarily be used as a load-bearing rope because it has a relatively low break strength (4,400 pounds for $\frac{1}{2}''$ size (theoretical)) for its size as compared with ropes of a similar diameter.

Field tests show that the present rope wick using a standard 1:2 mixture of glyphosate (sold under the trademark ROUNDUP of Monsanto Company) herbicide gives weed control results which are twice as high or effective as the solid braid nylon rope used in the prior art. The rope wick exhibits high flow rates and becomes so wet in use that it may exhibit some dripping of the herbicide solution. This dripping causes no appreciable harm to the crop presumably because the herbicide is effective when spread across a leaf surface as opposed to being dripped on a small area.

The above-described embodiments are intended to be illustrative, not restrictive. The full scope of the invention is defined by the claims, and any and all equivalents are intended to be embraced.

I claim:

1. A rope wick for the selective application by contact of liquid chemical solutions, such as herbicides, to plant foliage in an agricultural crop, said rope wick comprising:
    (a) a braided outer covering of abrasion resistant yarn; and
    (b) an inner core made of spun acrylic yarn.

2. The rope wick defined in claim 1 wherein said braided outer covering is made of polyester yarn having a braided construction selected from the group consisting of 10 carrier plain weave, 12 carrier plain weave, 16 carrier twill weave, 20 carrier twill weave, 24 carrier twill weave, 20 carrier basket weave, and 24 carrier basket weave.

3. The rope wick defined in claim 1 wherein said braided outer covering is made of plyester yarn in a 12 carrier plain weave braided construction having 2.7 to 4.0 picks per inch.

4. The rope wick defined in claim 1 wherein said outer covering is polyester yarn and comprises about 50% to 70% of the total fiber weight and said spun acrylic yarn comprises about 30% to 50% of the total fiber weight.

5. In a rope applicator to dispense liquid agricultural chemical solution upon physical contact with foliage and plants comprising a rope wick extending into said chemical solution and a rigid support boom supporting said rope wick, the improvement comprising:
    a rope wick comprising
    (a) a braided outer covering of polyester yarn; and
    (b) an inner core made of spun acrylic yarn.

6. A rope wick for selectively applying liquid chemical solution by contact with plant foliage, said rope wick comprising:
    (a) a 12 carrier plain weave braided outer covering of 32,000 denier polyester yarn having 3.3 picks/inch; and
    (b) an inner core of spun acrylic yarn, said inner core comprising six strands, each of said strands comprising cables of eight ends of two-ply 2.14 cc spun acrylic yarn, each ply or single yarn having a twist of 4 turns per inch, each of said eight ends having a plytwist of 2.5 turns per inch and each of said strands having a cable twist of 9 turns per foot;
    said rope wick having a total fiber content of about 66% polyester by weight and about 34% acrylic by weight.

* * * * *

UNITED STATES PATENT AND TRADEMARK OFFICE
CERTIFICATE OF CORRECTION

PATENT NO. : 4,328,640
DATED : May 11, 1982
INVENTOR(S) : William F. Revelle

It is certified that error appears in the above—identified patent and that said Letters Patent is hereby corrected as shown below:

Claim 3, line 2, "plyester" should read --polyester--.

Signed and Sealed this

Twenty-second Day of June 1982

[SEAL]

Attest:

GERALD J. MOSSINGHOFF

*Attesting Officer*  *Commissioner of Patents and Trademarks*